Dec. 21, 1937.　　T. H. WYNNE, SR　　2,102,986
EYEGLASS
Filed Aug. 31, 1936
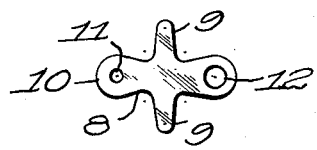
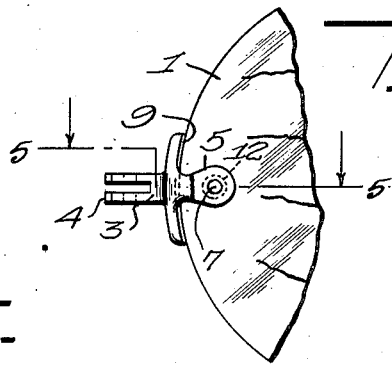
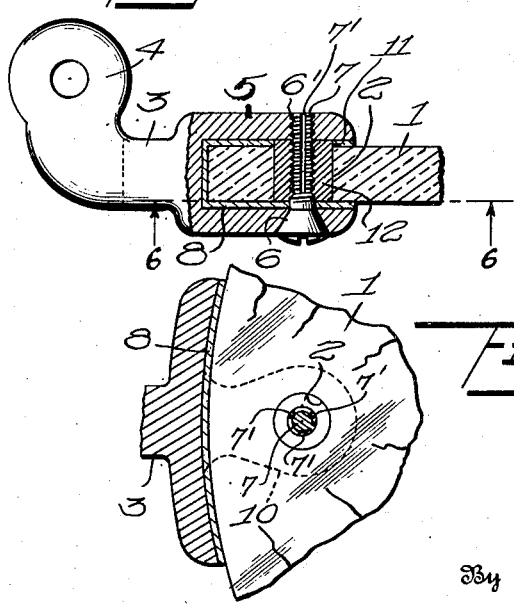
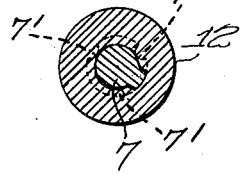
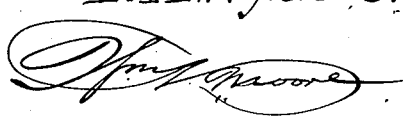
Inventor
T. H. Wynne Sr.
By
Attorney Patented Dec. 21, 1937

2,102,986

UNITED STATES PATENT OFFICE 2,102,986

EYEGLASS

Tillet H. Wynne, Sr., Griffin, Ga.

Application August 31, 1936, Serial No. 98,792

1 Claim. (Cl. 88—47)

My invention relates to improvements in eyeglasses and has special reference to the connecting means between the temple bars and the bridge connection of rimless eyeglasses.

One object of my invention is the provision of means which will co-act with the connecting strap member and the lens to provide a fastening member which will remain secured under all conditions and prevent improper movement or working loose of the strap member and lens.

Another object of my invention is the provision of securing means between the lens and strap member which will retain the parts in proper relation and which will have a sufficient cushion to absorb jar or shock and prevent damage to the lens.

Another object of my invention is the provision of a connecting means which will not mar or detract from the appearance of the eyeglass and which will attain the purposes of the invention in an efficient and practical manner.

With these objects in view my invention consists of a lens connection embodying novel features of construction and combination of parts substantially as described and claimed and as shown in the accompanying drawing, in which:—

Figure 1 represents a face view of the fusible lining member constructed according to my invention.

Figure 2 represents a similar view of the opposite side of the lining member.

Figure 3 represents an edge view of said lining member.

Figure 4 represents a front view of a portion of a lens and strap member with my lining member in position.

Figure 5 represents a sectional view on line 5—5 of Figure 4.

Figure 6 represents a sectional view on line 6—6 of Figure 5, and

Figure 7 represents a sectional view through the fusible sleeve and the fastening screw to show how the sleeve fuses into the screw to provide a secure fastening.

In the drawing the numeral 1 designates the lens of a rimless eyeglass provided with an opening 2, and 3 designates the curved strap conforming to the outer edge of the lens and having the arm 4 to which the temple bar is pivoted and the clip-on ears 5, which embrace the edge of the lens and formed with the countersunk opening 6, and the threaded opening 6', to receive the fastening screw or member 7.

The structure described is of well known and usual form and my invention resides in the lining member and in the form of the fastening screw having the vertical grooves 7', which coact with the fusible lining member as will presently appear.

In Figure 5 my invention is shown complete and it will be noted that the entire body of the fastening screw is threaded and that the vertical grooves extend the entire length of the screw and this is the most important feature of my invention for the reason, that the entire series of threads and the vertical channels receive the fused material of the tube which is a part of the strap member and thus a very large retaining surface is provided and it is practically impossible for the fastenings to work loose.

It will also be noted that in addition to having the large area to receive the fused material of the strap the tube through which the screw passes is an integral part of one of the ears of the strap, which insures a neat joint and an increased amount of material for fusing with the fastening screws.

The lining member is made of a suitable material having an inherent elastic quality and fusible in the presence of heat and comprises a flat blank or strap 8, having the portions 9, which engage the edge of the lens, the pair of ears 10, one formed with an opening 11, and the other carrying the short tube or sleeve 12, as clearly shown in Figures 1, 2 and 3.

In use this lining member has its strap portion 9, resting against the edge of the lens and the ears 10, embracing the edge of the lens with the sleeve 12 fitting the opening of the lens and all forming a lining for the connection, as clearly shown in Figure 5. The fastening screw passes through the sleeve and into the threaded opening of the clip or ears of the connection. When the parts are assembled the fusing by heat causes the lining to cement to the connection and lens and also causes the material of the sleeve 12 to flow into the vertical grooves 7', of the screw 7, causing the lining to form a perfect seal and binder between the lens, the connection and the fastening screw.

It will thus be seen that my improvements will retain the lens and connection in place; will not mar the appearance of the eyeglass; will retain the lenses in proper place and prevent breakage, and generally will prove efficient and practical.

I claim:—

In combination with an eyeglass lens having an opening near the edge thereof, a connection having a clip provided with an opening in line with said lens opening, a lining of fusible material between the lens and clip and having an ear formed with a tube adapted to fit said opening of the lens, and a fastening screw passing through the clip and lining, and tube and formed with screw threads extending the entire length of the screw and with grooves arranged perpendicular to and cutting through said screw threads and extending the entire length of said screw.

TILLET H. WYNNE, Sr.